United States Patent
Herding et al.

(10) Patent No.: US 6,709,589 B1
(45) Date of Patent: Mar. 23, 2004

(54) DIMENSIONALLY STABLE, CROSS-FLOW PERMEABLE FLUID TREATMENT ELEMENT

(75) Inventors: Walter Herding, Hahnbach (DE); Hans-Joachim Burger, Burglengenfeld (DE)

(73) Assignee: Herding GmbH Filtertechnik, Amberg (DE)

(*) Notice: Subject to any disclaimer, the term of this patent is extended or adjusted under 35 U.S.C. 154(b) by 0 days.

(21) Appl. No.: 09/647,808
(22) PCT Filed: Apr. 6, 1999
(86) PCT No.: PCT/EP99/02326
§ 371 (c)(1), (2), (4) Date: Nov. 30, 2000
(87) PCT Pub. No.: WO99/51543
PCT Pub. Date: Oct. 14, 1999

(30) Foreign Application Priority Data

Apr. 6, 1998 (DE) .......................................... 198 15 377

(51) Int. Cl.$^7$ .............................................. B01D 39/00
(52) U.S. Cl. .............................. 210/500.26; 210/502.1; 210/504; 210/505; 210/506; 210/508; 55/523; 55/524; 55/527; 264/DIG. 17; 264/DIG. 48
(58) Field of Search ................ 210/497.01, 500.26, 210/503, 504, 505, 506, 508, 509, 510.1, 502.1; 55/523, 524, 527; 264/DIG. 17, DIG. 48

(56) References Cited

U.S. PATENT DOCUMENTS 4,979,969 A * 12/1990 Herding
5,679,452 A  10/1997 Minagawa et al.

FOREIGN PATENT DOCUMENTS

| AT | 327 080 | 1/1976 |
| DE | 21 57 371 | 5/1973 |
| DE | 28 41 624 | 3/1980 |
| DE | 32 46 502 | 6/1984 |
| DE | 197 01 858 | 7/1998 |
| DE | 197 12 835 | 10/1998 |
| EP | 0 345 491 | 5/1989 |

OTHER PUBLICATIONS

Koshiishi, Kazumuro, "Inorganic Thermal Insulator", Chemical Abstracts vol. 109, No. 26, Dec. 26, 1988, pp. 308.

* cited by examiner

Primary Examiner—Robert J. Popovics
(74) Attorney, Agent, or Firm—Venable LLP; Robert Kinberg

(57) ABSTRACT

A dimensionally stable, flow-porous fluid treatment element suitable for hot fluid treatment, in particular a filter element, characterized by the following components:
(a) inorganic solid particles with inner voids; and
(b) hardened binder on a water glass base,
(c) the binder holding together the solid particles to form the flow-porous fluid treatment element.

14 Claims, 2 Drawing Sheets

DIMENSIONALLY STABLE, CROSS-FLOW PERMEABLE FLUID TREATMENT ELEMENT

BACKGROUND OF THE INVENTION

The subject of the invention is a dimensionally stable, flow-porous fluid treatment element suitable for hot fluid treatment, in particular a filter element, characterized by the following components:

(a) inorganic solid particles with inner voids; and (b) hardened binder on a water glass base, (c) the binder holding together the solid particles to form the flow-porous fluid treatment element.

Such fluid treatment elements have become known with a great variety of solid particles and a great number of binders.

SUMMARY OF THE INVENTION

Compared to known fluid treatment elements, the inventive fluid treatment element is characterized by a combination of excellent properties:

one can use relatively inexpensive basic materials;

production is simple and inexpensive;

the fluid treatment element has low weight based on its volume, which reduces the expense for the raw material used and reduces the technical effort for a supporting structure optionally to be provided for the fluid treatment element;

the fluid treatment element is suitable for treating fluids which are at elevated temperature.

One preferably provides solid particles with inner voids selected from the following group of materials:

foam glass particles;

foamclay particles.

Foam glass particles have the advantage of excellent chemical resistance and are frequently produced from recycled glass. They are available on the market and show a closed sheath which is spherical to a first approximation and has some walls running through the interior but is otherwise hollow for the most part. Compared to massive glass particles, foam glass particles have much lower specific gravity while strength is not essentially reduced. In the solid particles used according to the invention, the inner voids can be closed off from the surroundings of the particular solid particle (as in foam glass particles) but can also all or partly have a connection to the surroundings of the particular solid particle.

Solid particles are preferably provided which have for the most part a size within the limits of 0.2 to 1 mm, preferably 0.3 to 0.7 mm. The choice of particle size determines the pore size in the fluid treatment element. "For the most part" means more than 50% of the volume or weight of the solid particles, preferably more than 90%. However, if one desires e.g. a fluid treatment element with very great porosity between the solid particles, one can also use solid particles with a greater size. In particular for shaped bodies as catalyst supports in exhaust systems, particles sized 1.0 to 2.0 mm are preferred as favorable.

Preferably, the binder is soda water glass, potassium water glass, lithium water glass or a mixture of at least two of said water glasses. A mixture of soda water glass and potassium water glass is especially usual on the market.

For hardening the water glass based binder one can use the methods common for such binders, in particular gassing with $CO_2$, promoting $CO_2$ absorption from the air by heating, long-time hardening at ambient temperature in air, admixing a metal oxide to the water glass, admixing an acid to the water glass, admixing an ester to the water glass. It is especially preferable to use a quite novel way of hardening, however, i.e. contacting the raw fluid treatment element (i.e. the as yet unhardened fluid treatment element) with a hardening fluid on an alcohol base. Preferably, the hardening fluid consists of alcohol to a considerable extent, the specific limits preferably being at least 30% alcohol, more preferably at least 40% alcohol, even more preferably at least 50% alcohol, even more preferably at least 70% alcohol, even more preferably about 100% alcohol (as commercially available). The component responsible for the hardening process is preferably a monohydric alcohol or a mixture of several monohydric alcohols. Alcohols which are especially useful and available easily and cost-effectively are ethanol, methanol, isopropanol, methylated spirit (=denatured ethanol). Due to the porous structure of the raw fluid treatment element it is simple in terms of technical procedure to contact the water glass based binder in the total raw fluid treatment element with the hardening fluid to the necessary extent. It has surprisingly turned out that such contacting leads to a spontaneous hardening of the binder within a very short time (substantially within a few seconds). It is an immense advantage for production that the fluid treatment element can be brought from the raw, unhardened state to the hardened state without the use of a heating step and without the use of a long hardening time. Since the hardening process takes place very fast with the alcohol-based hardening fluid, it presumably does not involve a chemical reaction with the binder but rather a physical process probably having removal of water from the binder as an important effect.

No components need normally be added to the above-mentioned main components of the fluid treatment element (solid particles with inner voids and hardened binder on a water glass base) in order to create the fundamental structure of the fluid treatment element. However, it is pointed out that in particular in cases where relatively high strength of the fluid treatment element is required, it may be preferred as favorable to provide a strengthening component, preferably in the form of a fibrous mat. The fibrous mat can be provided in particular on a surface of the fluid treatment element, but also as an inner fibrous mat. One can use fibrous mats of customary design, in particular woven mats. As materials one can use the customary fibers, in particular glass fibers, but also carbon fibers, mineral fibers and others.

Besides the abovementioned components, the material constituting the raw fluid treatment element can contain a minor amount of further components, preferably selected from the following group, i.e. one component from one group or several components from one group or several components from several groups:

one or more fillers, preferably talc or quartz powder;

one or more auxiliary agents or additives;

fibers for increasing strength, preferably glass fibers but also other fibers as stated in the above paragraph.

The fillers can increase the pliability of the material for the raw fluid treatment element and thereby improve processibility of said material. They furthermore increase strength and reduce shrinkage during hardening from the raw fluid treatment element to the finally shaped fluid treatment element. The stated fibers are normally admixed to the binder and are present in random arrangement in the material to be shaped. This is the difference over the abovementioned fibrous mats. The stated additional components must be distinguished from components which are added to the fluid treatment element after hardening if desired, e.g. certain surface layers, impregnations and the like.

Preferably, the material from which the raw fluid treatment element is to be shaped has the following weight percent ranges based on total weight:

10–50% water glass
0–5% filler or fillers
0–5% auxiliary agents or additives
0–5% fibers
35–90% solid particles with inner voids (as the balance).

For the water glass the stated weight percent range refers to commercial water glass which usually has a solids content around 50%, or somewhat lower, balance water. Further, it is pointed but that many fillers, in particular the abovementioned talc or the abovementioned quartz powder, many auxiliary agents and/or additives, and also fibers distributed in the material have very low specific gravity. Despite the stated low weight percent ranges of said components, said components can constitute a clearly higher share of the volume of the raw material to be shaped. Finally, it is pointed out that a fibrous mat possibly present for increasing strength was not included in the reference weight of 100% of the material to be shaped.

For the inventive fluid treatment element there are a host of possible technical uses and applications. Some of these should be stated and emphasized as especially preferable:

filter element for gases or liquids;
filter element for the flue-gases of combustion plants;
particle filters for exhaust systems of diesel engines;
base bodies with catalytic coating for catalytic emission control systems (e.g. as known from the exhaust sections of motor vehicles).

Although the inventive fluid treatment element is a technical element that can be used at elevated temperature by reason of its design, it can of course also be used for fluid treatment at non-elevated temperatures. The inventive structure of the fluid treatment element, in particular with solid particles in the form of foam glass particles or foamclay particles, ensures its ability to be used at a continuous operating temperature of over 200° C. but even much higher continuous operating temperatures are not a fundamental problem. Special reference is made to the possibility of filtration or catalytic treatment of flue gases in the temperature range from 200 to 950° C.

If the inventive fluid treatment element is a filter element, it preferably has on its afflux surface in the operational final state a surface filtration layer with a smaller pore size than in the filter element below the surface filtration layer. Filter elements with surface filtration layers have in particular the advantages that the filter element can be cleaned well by backflow and that the pores in the interior of the filter element are not clogged, which would constantly increase the flow resistance of the filter element in the long term. A surface filtration layer of fibers, preferably glass fibers or mineral fibers, or of inorganic solid particles is especially preferred.

The inventive fluid treatment element can be produced by a method which is characterized in that
(a) the components for the raw fluid treatment element are mixed to a ductile or flowable material;
(b) the material is introduced into a mold;
(c) the mold contents are hardened, preferably by supplying a hardening fluid on an alcohol base in an amount such that the binder is contacted at least almost completely by the hardening fluid; and
(d) the hardened fluid treatment element is taken from the mold.

Although contacting with the hardening fluid leads to such extensive spontaneous hardening of the molding that it can be taken from the mold and has good initial dimensional stability, it is frequently followed by final drying and posthardening, in particular at ambient temperature or at elevated temperature of preferably 100 to 150° C. Hardening the binder with the stated hardening fluid allows the molding to be removed from the mold after a short time, preferably after less than 60 s, most preferably after less than 30 s. It is favorable to remove surplus hardening fluid from the molding either before removal from the mold or after removal from the mold, e.g. by drainage, centrifuging, blowing or sucking, evaporation.

The mold in which the molding is produced can have a very simple shape (e.g. cuboid for producing platelike products) but also a more complicated shape. The mold can preferably also contain mold cores so as to produce a molding with at least one inside cavity which is closed off from the outside or has a connection to the outside. In most cases it is favorable to provide a single-split or a multiple-split mold. Depending on the consistency of the molding material one can let it flow into the mold, but also introduce it and subsequently apply a certain compacting pressure, or introduce it and support the filling of the mold by vibration or the like.

BRIEF DESCRIPTION OF THE DRAWINGS

The invention will be explained in more detail in the following with reference to examples.

DETAILED DESCRIPTION OF THE INVENTION

Figure 1:
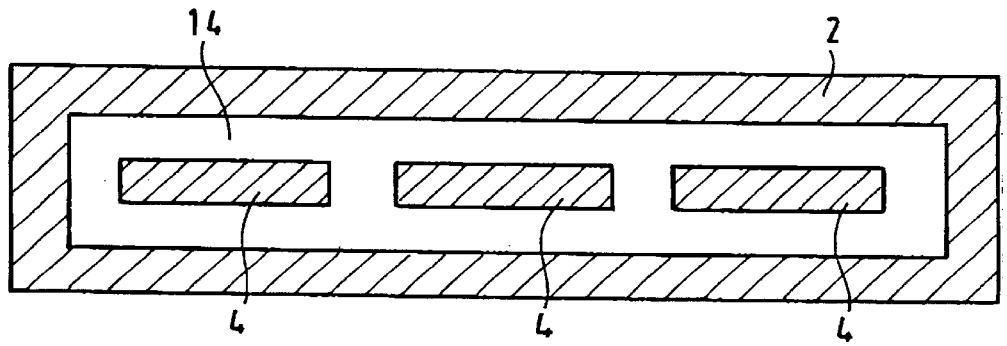
FIG. 1 shows a top view of a first production mold.

First production mold 2 shown in FIG. 1 has the shape of a relatively flat, hollow cuboid which is closed on five sides and open on the sixth side. From the open side three mold cores 4 are inserted which are spaced apart and each have a rectangular cross section. Cores 4 are seen in cross section in FIG. 1 because they protrude upward out of the open mold.

Figure 2:
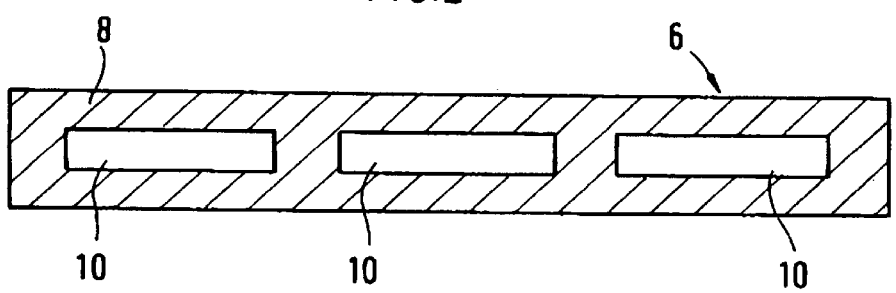
FIG. 2 shows a horizontal cross section of a fluid treatment element after removal from the first production mold.

FIG. 2 shows fluid treatment element 6 produced in the first production mold according to FIG. 1 after removal from production mold 2. It can be used in particular in such a way that outside surface 8 constitutes the afflux surface of fluid treatment element 6 while the pure gas or liquid is removed upward out of chambers 10.

Figure 3:
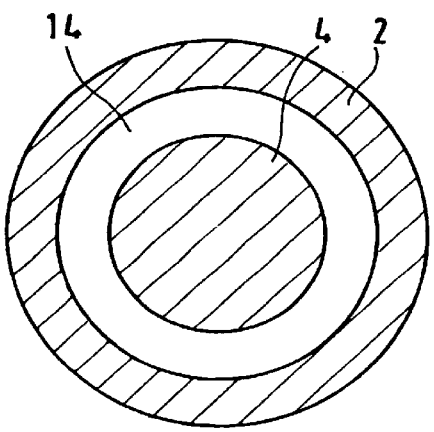
FIG. 3 shows a top view of a second production mold.

Second production mold 2 shown in FIG. 3 has a cylindrical mold cavity in which small-diameter cylindrical core 4 is disposed. Thus, production mold 2 permits a fluid treatment element having the shape of a pipe section to be produced.

Figure 4:
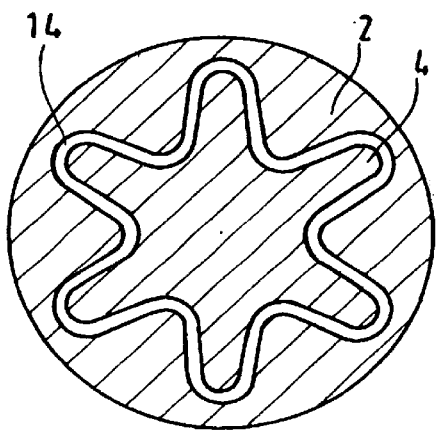
FIG. 4 shows a top view of a third production mold.

Third production mold 2 shown in FIG. 4 has a mold cavity which is wavy cylindrical as a modification of the mold cavity of the second production mold. Core 4 has an outside contour which follows these waves in spaced fashion. The third production mold thus permits a fluid treatment element having the shape of a corrugated pipe section to be produced.

It is pointed out that first, second and third production molds 2 can be provided such that cores 4 extend in production mold 2 up to its lower end, in which case the inner cavity of produced fluid treatment elements 6 is open at the lower end and at the upper end. Alternatively, one can dispose cores 4 with the lower front end spaced from the lower end of the mold cavity, in which case one produces fluid treatment elements 6 whose cavities are closed at the bottom and open only at the top.

Figure 5:
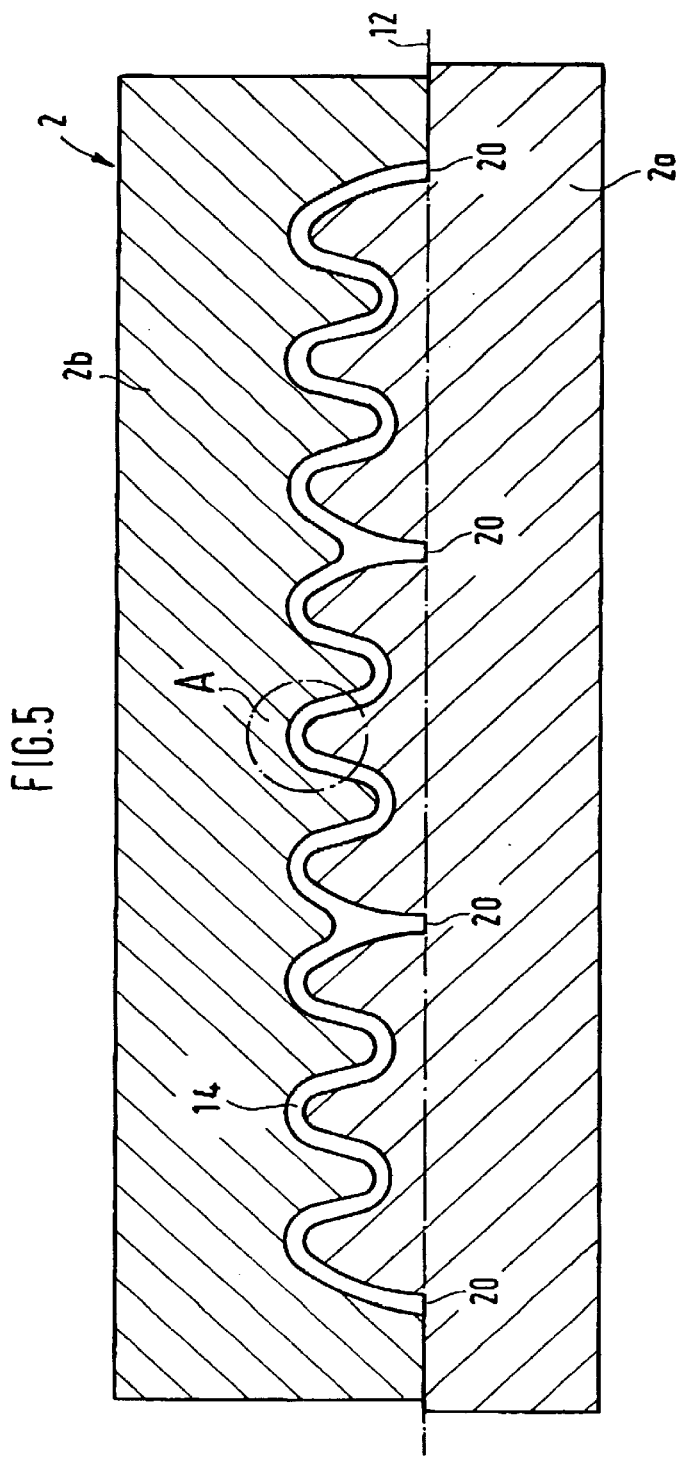
FIG. 5 shows a vertical cross section through a "horizontal" fourth production mold.

FIG. 5 shows fourth production mold 2 with a somewhat more complicated geometric shape. There is "horizontal" lower mold part 2a having a sequence of parallel "hills" and "valleys". "Horizontal" upper mold part 2b is analogously profiled with hills and valleys on its lower side. When lower mold part 2a and upper mold part 2b are assembled on mold separation part 12, as shown in FIG. 5, they limit mold cavity 14 which is formed like thick corrugated sheet.

For producing fluid treatment element half 6' one feeds a metered amount of material mixed from the components into lower mold part 2a when production mold 2 is open. Then one lowers upper mold part 2b in the direction of lower mold part 2a and presses it on strongly enough to exert compacting pressure on the mold contents.

If desired for increasing the strength of fluid treatment element half 6', one can insert a fibrous mat, in particular a glass fiber mat, before introducing the material into lower mold part 2a, or alternatively first feed part of the material into lower mold part 2a and then place the fibrous mat thereon.

Figure 6:
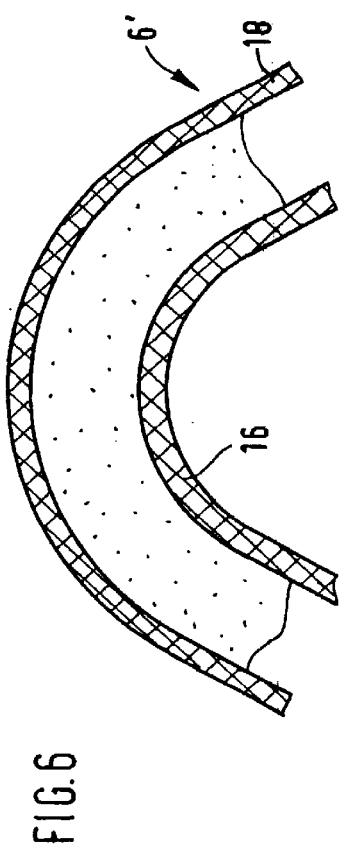
FIG. 6 shows in cross section an enlarged detail of a fluid treatment element at place A in FIG. 5, produced in the fourth production mold; finally, a composition example is stated.

FIG. 6 illustrates in an enlarged view what fluid treatment element half 6' looks like in detail. The porous structure from inorganic solid particles with inner voids which are held together by hardened binder on a water glass base is indicated by stippling. Fibrous mat 16 in the area of a surface of fluid treatment element half 6' is indicated by double hatching. It is furthermore illustrated that surface filtration layer 18, indicated by double hatching, can subsequently be applied on the outer side of fluid treatment element half 6'.

If one imagines second fluid treatment element half 6" placed from below in mirror-inverted fashion against first fluid treatment element half 6' produced in production mold 2 of FIG. 5, and connected therewith at places 20 (preferably with the aid of water glass binder), one again has a, roughly speaking, wavy flat cuboid fluid treatment element with cavities. One can again make the cavities open at their two ends. Alternatively, fourth production mold 2 can be formed on one side such that the cavities are closed on one side, in which case one has wavy flat cuboid fluid treatment element 6 which is closed on five sides and open on the sixth side toward the cavities.

COMPOSITION EXAMPLE

A material with the following composition was produced:
32 wt % commercial water glass (mixture of soda water glass and potassium water glass, solids content 45%);
3 wt % talc
65 wt % foam glass particles (0.25 to 0.5 mm).

This material had a consistency comparable to the consistency of moist earth. The material was fed into a mold as shown in FIG. 1, the cuboid mold cavity (imagined without cores) enclosing approximately the size of 30 cm×20 cm×5 cm. The mold and cores were made of metal. When the described material was fed in, a kind of die was used to press on the mold contents in order to compact them moderately.

Then, 100 ml of methylated spirit was poured into the mold contents from above in distributed fashion. Dripping of surplus methylated spirit out of the bottom of the mold (out of the mold joint with a split mold, otherwise out of thin liquid outlets) indicated that the mold contents had been contacted with methylated spirit with the necessary completeness, After a very short time (10–20 s) one could ascertain by finger pressure on the upper side of the mold contents that hardening had occurred. The molding could then be removed.

The molding was subsequently posthardened in a furnace for 1 hour at 120° C.

A material with the same composition could be used analogously in the production molds according to FIGS. 3, 4 and 5.

What is claimed is:

1. A dimensionally stable, flow-porous filter element for filtering hot fluid, comprising (a) a dimensionally stable, flow-porous molding having the following components:
foamclay solid particles with inner voids,
hardened binder on a water glass base, and
talc as a filler,
the binder holding together the solid particles to form the flow-porous molding, (b) and a surface filtration layer on an afflux surface of the filter element, the surface filtration layer having a smaller pore size than the filter element below the surface filtration layer.

2. A filter element according to claim 1, where more than 50% of the solid particles have a size within the limits of 0.2 to 1 mm.

3. A filter element according to claim 1, where more than 50% of the solid particles have a size with the limits of 0.3 to 0.7 mm.

4. A filter element according to claim 1, where said binder comprises at least one of soda water glass, potassium water glass, and lithium water glass.

5. A filter element according to claim 1, where said binder is hardened by contacting a raw form of the flow-porous molding with a hardening fluid on an alcohol base.

6. A filter element according to claim 5, where the alcohol base comprises at least one type of monohydric alcohol.

7. A filter element according to claim 6, where the at least one type of monohydric alcohol comprises at least one of ethanol, methanol, isopropanol, and methylated spirit.

8. A filter element according to claim 1, wherein the filter element further comprises at least one of 1) an auxiliary agent, 2) an auxiliary additive, and 3) fibers.

9. A filter element according to claim 1, when the following components are present in the following weight percent ranges, based on the weight of a raw form of the filter element:
10 to 50% water glass
up to 5%
0 to 5% auxiliary agents and/or additives
0 to 5% fibers
35 to 90% solid particles.

10. A filter element according to claim 1, further having a fibrous mat for increasing strength.

11. A filter element according to claim 10, wherein the fibrous mat is a glass fiber mat.

12. A filter element according to claim 1, further having a surface filtration layer constituted with fibers.

13. A filter element according to claim 12, when said fibers are glass fibers.

14. A filter element according to claim 1, when the molding comprises two separately produced and subsequently interconnected molding halves.

* * * * *